United States Patent
Ando et al.

(10) Patent No.: US 6,600,524 B1
(45) Date of Patent: Jul. 29, 2003

(54) ACTIVE MATRIX TYPE LIQUID CRYSTAL DISPLAY APPARATUS WITH SILICON OXIDE AT DIFFERENT PORTIONS

(75) Inventors: Masahiko Ando, Hitachinaka (JP); Masatoshi Wakagi, Hitachi (JP)

(73) Assignee: Hitachi, Ltd., Tokyo (JP)

( * ) Notice: Subject to any disclaimer, the term of this patent is extended or adjusted under 35 U.S.C. 154(b) by 79 days.

(21) Appl. No.: 09/678,661

(22) Filed: Oct. 4, 2000

(30) Foreign Application Priority Data

Oct. 5, 1999 (JP) .......................................... 11-283830

(51) Int. Cl.[7] .............................................. G02F 1/136
(52) U.S. Cl. ....................... 349/43; 349/46; 349/122; 349/138; 257/59; 257/411; 257/640; 257/647; 257/648
(58) Field of Search .......................... 349/46, 43, 122, 349/138; 257/59, 411, 640, 647, 648

(56) References Cited

U.S. PATENT DOCUMENTS 5,554,547 A * 9/1996 Ha ............................... 437/40
5,892,562 A * 4/1999 Yamazaki et al. ........... 349/141
5,962,916 A * 10/1999 Nakanishi et al. ........... 257/640
6,136,444 A * 10/2000 Kon et al. ................ 428/423.1
6,380,011 B1 * 4/2002 Yamazaki et al. ........... 438/163

FOREIGN PATENT DOCUMENTS

JP            8-62578 A  *  3/1996  ........... G02F/1/133

* cited by examiner

*Primary Examiner*—Robert H. Kim
*Assistant Examiner*—Andrew Schechter
(74) *Attorney, Agent, or Firm*—Antonelli, Terry, Stout & Kraus, LLP

(57) ABSTRACT

An improved liquid crystal display apparatus for low power consumption has a thin film transistor as a switching device. The thin film transistor has a gate insulating layer of laminated film of silicon nitride and silicon oxide, a semiconductor layer, a drain electrode and a source electrode, and supplementary insulating layer, laminated in order on the gate electrode. The supplementary insulating layer includes a portion of silicon oxide formed by oxidizing a surface of the semiconductor layer.

3 Claims, 5 Drawing Sheets

FIG. 6
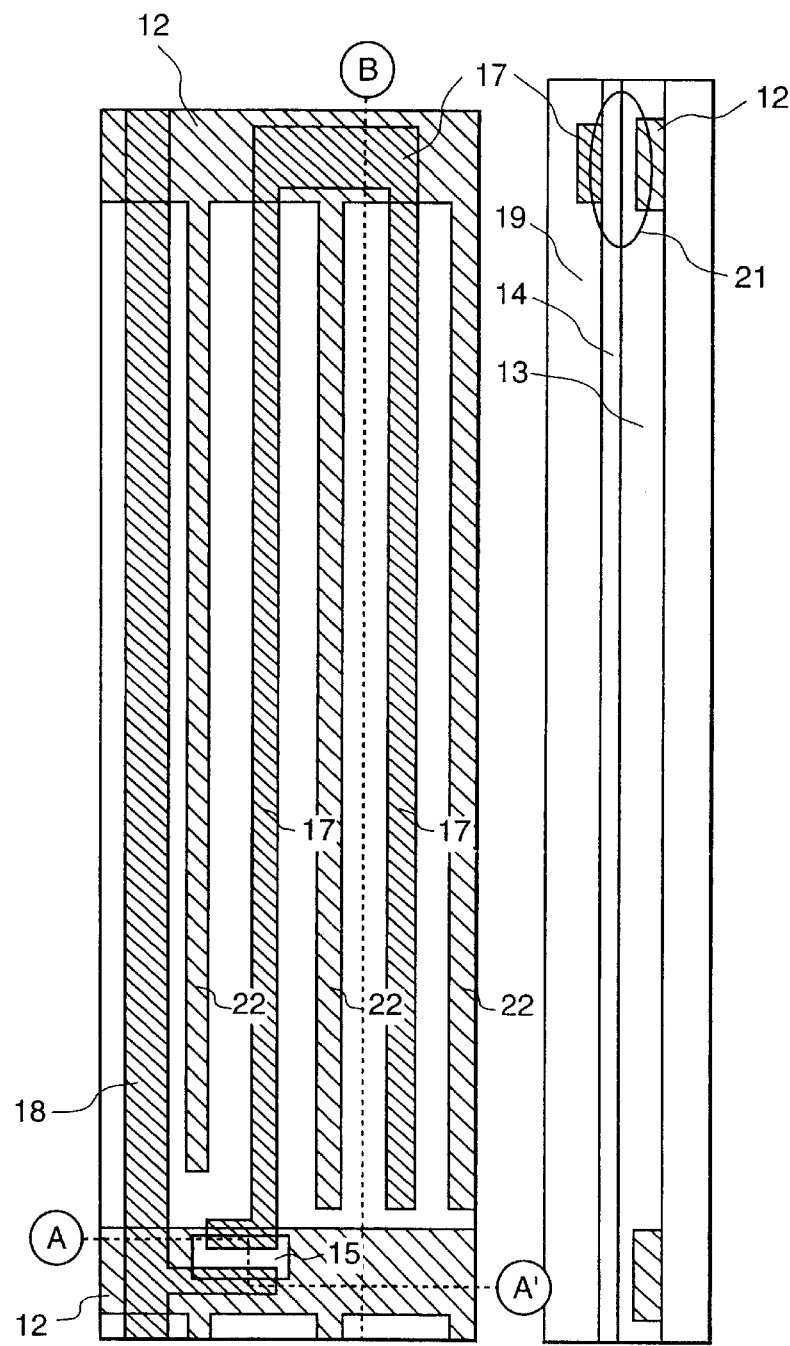
FIG. 6B
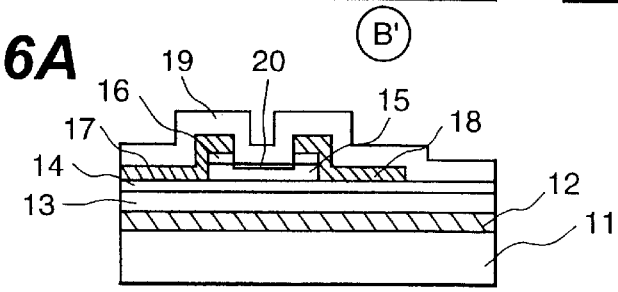
FIG. 6A

ACTIVE MATRIX TYPE LIQUID CRYSTAL DISPLAY APPARATUS WITH SILICON OXIDE AT DIFFERENT PORTIONS

BACKGROUND OF THE INVENTION

The present invention relates to an active matrix type liquid crystal display apparatus, and, more particularly, to an active matrix type liquid crystal display apparatus which is suitable for an In-Plane Switching system (IPS) in which the angle of visibility is wide and power consumption is low.

In recent years, an active matrix type liquid crystal display apparatus using switching devices, typically thin film transistors, has been widely used as a monitor for a personal computer, a work station, etc., because its picture quality is substantially equal to that of a CRT, its power consumption is lower and its size is smaller than that of the CRT. In such an active matrix type liquid crystal display apparatus, an in-plane switching (IPS) system has been developed, in which the scanning wiring, the signal wiring and the common wiring are arranged on the same substrate, and two electrodes, a pixel electrode and a common electrode, are formed in the shape of a comb. Accordingly, the direction of the electric field applied to the liquid crystal is approximately parallel with the surface of the substrate. Because a liquid crystal display apparatus using the IPS system has a wider angle of visibility compared with the conventional liquid crystal display apparatus, a liquid crystal display apparatus using this system is well suitable for a direct-viewing monitor.

Although the IPS system has the characteristics described above, the aperture area through which light can be transmitted is narrow, and thus the display screen is relatively dark. Thus, it is necessary to use a bright back light in an IPS type liquid crystal display apparatus. In other words, the power consumption is very large in a liquid crystal display apparatus using the IPS system.

In order to enlarge the aperture area of a liquid crystal display apparatus using the IPS system, Japanese Patent Application Laid-Open No. 8-62578 discloses an improved display apparatus, in which the common wiring is eliminated by making the scanning wiring assume the role of the common wiring for applying a voltage from outside to a common electrode. Hereinafter, such an IPS system will be called a common-wiring-less IPS system.

In a thin film transistor used as a switching device for a normal active matrix type liquid crystal display apparatus, the gate voltage at which a current starts to flow between a drain and a source of a transistor causing the transistor to be shifted to a "ON" state, i.e. the threshold voltage Vth of the gate, is 1 volt. In contrast, for the reason described in Japanese Patent Application Laid-open No. 8-62578, a thin film transistor with a Vth which is equal to or more than the maximum drive voltage required to optically modulate the liquid crystal, preferably equal to or more than 10 volts, is used in the common-wiring-less IPS system. It is desirable to provide uniform characteristics to such a thin film transistor, showing enhancement type switching characteristics, and further to provide a low-cost display apparatus.

SUMMARY OF THE INVENTION

The present invention provides an improved active matrix type liquid crystal display apparatus which is suitable for a low-cost common-wiring-less IPS system. Further, the present invention provides an improved thin film transistor showing switching characteristics of the uniform enhancement type.

An active matrix type liquid crystal display apparatus according to the present invention has a thin film transistor operating as a switching device. The thin film transistor has a gate insulating layer, a semiconductor layer, a drain electrode and a source electrode, and supplementary insulating layer, laminated in order on the gate electrode. The thin film transistor further has silicon oxide disposed between the gate insulating layer and the semiconductor and between the supplementary insulating layer and the semiconductor layer. Therefore, the gate insulating layer consisting of a single silicon oxide layer, or a lamination of silicon nitride and silicon oxide films, and a supplementary insulating layer consisting of silicon oxide are used in accordance with the present invention. Instead of the supplementary insulating layer consisting of silicon oxide, it is possible to form the supplementary insulating layer by oxidizing the surface of the semiconductor. Composition ratios (x) of silicon oxide (SiOx) used between the gate insulating layer and the semiconductor layer and between the supplemental insulating layer and the semiconductor layer preferably are selected so as to be equal to or more than 1.7. By manufacturing the transistor as indicated above, it becomes possible to obtain a thin film transistor which exhibits enhancement type TFT characteristics, with the threshold voltage being equal to or more than 10 volts.

BRIEF DESCRIPTION OF THE DRAWINGS

These and other objects, features and advantages of the present invention will be understood more clearly from the following detailed description with reference to the accompanying drawings, wherein:

FIG. 6 is a plane sectional view showing a pixel part in the liquid crystal display apparatus of the present invention.

FIG. 6A is a sectional view taken along line A–A' in FIG. 6.

FIG. 6B is a sectional view taken along line B–B' in FIG. 6.

DETAILED DESCRIPTION OF THE PREFERRED EMBODIMENTS

Embodiment 1

Figure 1:
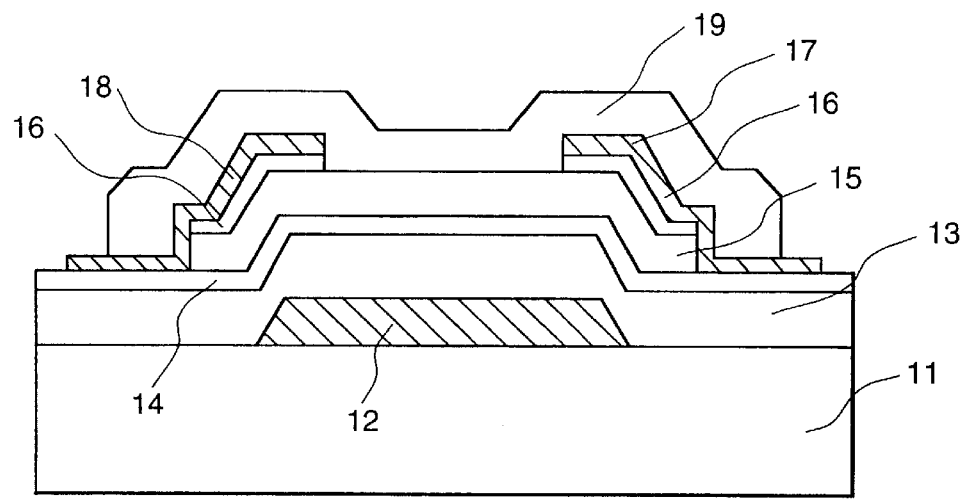
FIG. 1 is a sectional view showing the structure of a thin film transistor used in an embodiment of a liquid crystal display apparatus of the present invention.

FIG. 1 is a sectional view showing the structure of a thin film transistor used in an embodiment of a liquid crystal display apparatus of the present invention.

This structure has a so-called inverse stagger configuration in which the source/drain electrodes are arranged upward with respect to the gate electrode. In FIG. 1, there is a glass substrate 11, a gate electrode 12 consisting of Cr, a first gate insulating layer 13 consisting of silicon nitride, a second gate insulating layer 14 consisting of silicon oxide, a semiconductor layer 15 consisting of amorphous silicon, a contact layer 16 consisting of n+ amorphous silicon in which phosphor is doped, a source electrode 17 and a drain electrode 18, each consisting of Cr, and a supplementary insulating layer 19 consisting of silicon oxide. This thin film transistor was manufactured in the following way. First, a Cr film that is 120 nm thick is formed on a Corning 1737 glass substrate 11 by using a sputtering method. Next, the gate electrode 12 is formed by patterning Cr using a photo-etching method. By using a plasma chemical vapor deposition (CVD) method, thin films are formed in order as follows. First, a first gate insulating layer 13 that is 250 nm thick consisting of silicon nitride is formed using a gas mixture of $SiH_4$, $NH_3$, $N_2$, etc. Next, a second gate insulating layer consisting of silicon oxide that is 10 nm thick is formed using a gas mixture of $SiH_4$ and $N_2O$ on the first insulating layer. Further, on the second insulating layer, an amorphous silicon film that is 150 nm thick is formed by using a gas mixture of $SiH_4$ and $H_2$, and then an n+ amorphous silicon film that is 30 nm thick is formed using $SiH_4$ and $PH_3$. With regard to the above-mentioned formation of the thin film, it is desirable to sequentially carry out processes while a vacuum state is being held. Then, a semiconductor layer 15 is formed by working an n+ amorphous silicon film and an amorphous silicon film like an island at the same time, by photo-etching. On the semiconductor film 15, a source electrode 17 and a drain electrode 18 are formed by photo-etching and patterning of the Cr film that is 120 nm thick and is formed by using a sputtering method. Further, by etching and eliminating n+ amorphous silicon film between source and drain electrodes, contact layer 16 is formed between source electrode 17 and semiconductor layer 15, and between drain electrode 18 and semiconductor layer 15. Finally, supplementary insulating layer 19 is formed by photo-etching and pattern-working of the silicon oxide film that is approximately 300 nm thick and is deposited by the plasma CVD method using a mixed gas, for example, of $SiH_4$ and $N_2O$.

Figure 2:
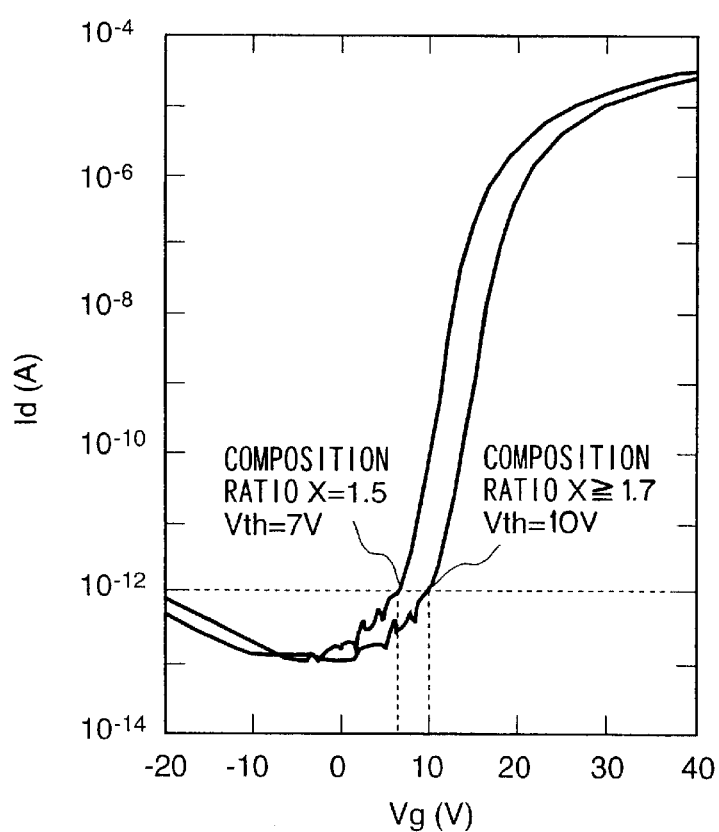
FIG. 2 is a graph showing the Id-Vg characteristics of the thin film transistor.

FIG. 2 is a graph showing the dependence (Id-Vg characteristics) of the drain current (Id) on the gate voltage (Vg) of the thin film transistor according to the above embodiment of the present invention. In this thin film transistor, the threshold voltage Vth is at 10 volts, defined by the gate voltage at which the drain current becomes $1 \times 10^{-12}$ Ampere. Namely, because the targeted enhancement type TFT characteristics are obtained, it is not required to control the threshold voltage after completion of the thin film transistor.

In order to obtain a value of Vth that is equal to or more than 10 volts in the thin film transistor according to this embodiment, it is desirable to set the composition ratio (x) of silicon oxide (SiOx) used in the gate insulating layer 14 and the supplementary insulating layer 19 to a value equal to or more than 1.7. For example, when silicon oxide with x=1.5 was used as the supplementary insulating layer, Vth was at 7 volts, as shown in FIG. 2.

Figure 3:
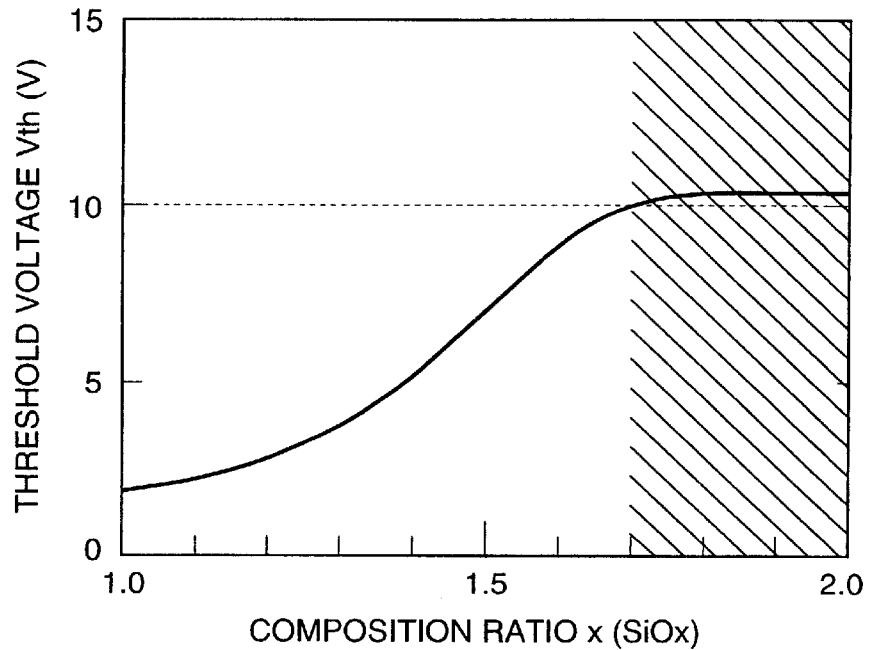
FIG. 3 is a graph showing the dependence of the threshold voltage of the thin film transistor on the composition ratio of silicon oxide.

FIG. 3 shows the dependence of the threshold voltage Vth of the thin film transistor on the composition ratio (x) of silicon oxide SiOx used in the gate insulating layer and the supplementary insulating layer. As seen from FIG. 3, Vth increases monotonously as the composition ratio (x) increases. When x<1.7, Vth<10 V, and when x≧1.7, Vth≧10 V and Vth finally becomes saturated. The composition ratio of silicon oxide SiOx depends upon the flow rate of $N_2O$ gas to $SiH_4$ at the time when the SiOx film is formed. When the flow rate was set to a value equal to or more than 100, silicon oxide SiOx with x being equal to or more than 1.7 was obtained.

As described above, it turned out that it is desirable to make both the gate insulating layer 14 and the supplementary insulating layer adjacent to the semiconductor layer 15 with silicon oxide SiOx, and to set the composition ratio of the silicon oxide to a value equal to or more than 1.7. If the composition ratio of at least one silicon oxide is set to a value less than 1.7, or at least one layer is made of, for example, silicon nitride (not silicon oxide), then Vth is less than 10 volts.

The reason why Vth is less than 10 volts in such a case will be explained hereinafter. For example, as described in Masatuyo KISHINO "Fundamentals Of Semiconductor Device" P167, OHM company, 1985, the threshold voltage Vth of a thin film transistor is generally determined by the sum of the flat band voltage Vfb, the minimum voltage φf applied to semiconductor layer 15 to cause the drain current to start flowing, and the surface voltage Vbs at the adjacent surface between the semiconductor layer 15 and the supplementary insulating layer 19. Namely, $Vth = Vfb + \phi f + Vbs$ Values of Vfb, φf and Vbs are determined by the materials of the gate insulating layer 14, semiconductor layer 15 and supplementary insulating layer 19, respectively. The minimum voltage in the semiconductor layer 15 consisting of amorphous silicon is approximately 15 volts, and if silicon nitride is used, Vfb=Vbs=−4.5 volts.

Figure 4:
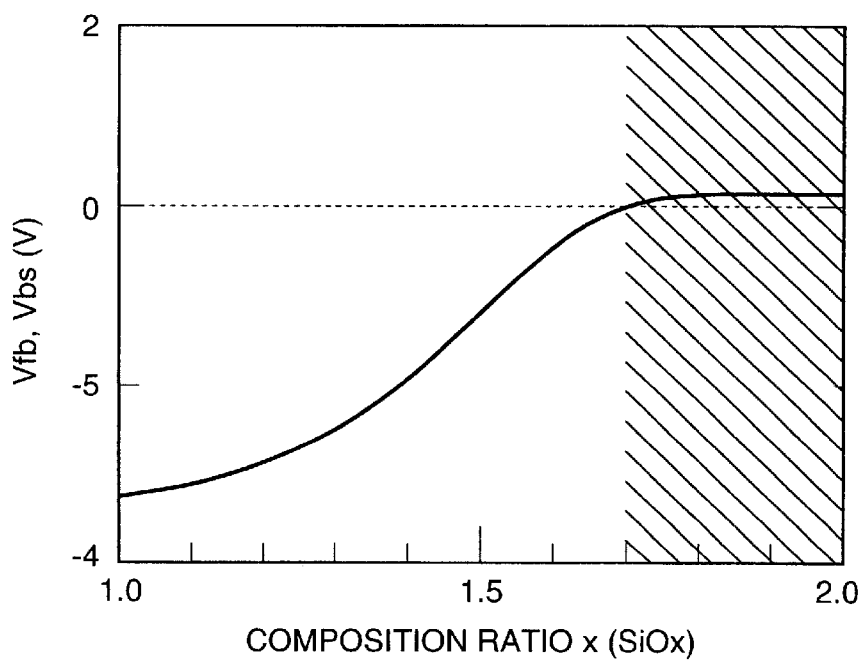
FIG. 4 is a graph showing the dependence of the flat band voltage and surface potential of silicon oxide used in the thin film transistor on the composition ratio.

While, in the silicon oxide film SiOx formed by using a plasma CVD method, the composition ratio (x) generally exhibits a value less than or equal to 2, which is the stoichiometric composition. As shown in FIG. 4, Vfb and Vbs increase onotonously as the composition ratio (x) increases, and when x=1.7, it saturates at Vfb (=Vbs)=0.

Accordingly, in the conventional thin film transistor in which silicon nitride is used for the gate insulating layer 14 and the supplementary insulating layer 19, Vth=−4.5+10−4.5=1 volt, that is, the threshold voltage is less than 10 volts. While, in the thin film transistor of the present invention in which the composition ratio (x) of silicon oxide SiOx at a part of the supplementary insulating layer adjacent to the semiconductor layer is equal to or more than 1.7, the threshold voltage Vth 0+10+0=10 volts, and thus the desirable enhancement type TFT characteristics can be obtained. However, if the silicon oxide with its composition ratio (x)<1.7 is used for any one of the gate insulating layer and the supplementary insulating layer, then Vth<10 volts, and thus the predetermined enhancement type TFT characteristics can not obtained. Further, if the silicon nitride is used for one of the gate insulating layer and the supplementary insulating layer, then Vth=0+10−4.5 V=5.5 V, even though the composition ratio of the other silicon oxide is equal to or more than 1.7, and thus the predetermined enhancement type TFT characteristics can not obtained.

Although the inverse stagger structure is adopted as a thin film structure in this embodiment, a stagger or a co-planner structure may be adopted if the gate insulating layer and the supplementary insulating layer consist of silicon oxide. Further, although the semiconductor layer consists of amorphous silicon in this embodiment, microcrystal silicon, polycrystal silicon, or monocrystal silicon may be adopted.

Embodiment 2

Figure 5:
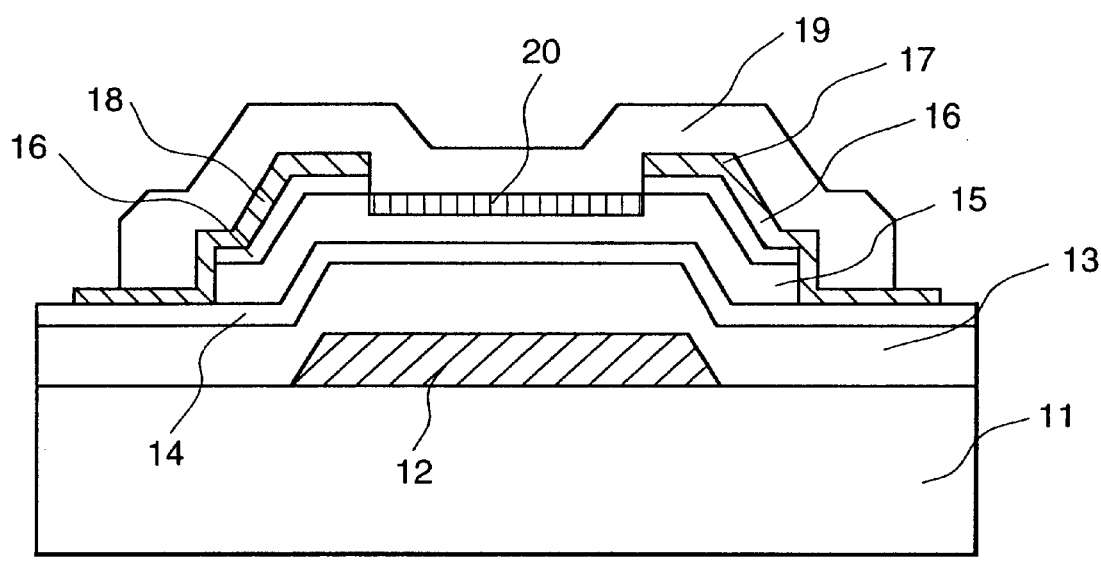
FIG. 5 is a sectional view showing the structure of a thin film transistor used in another embodiment of a liquid crystal display apparatus of the present invention.

FIG. 5 shows the structure of a thin film transistor used in a second embodiment of a liquid crystal display Apparatus of the present invention. The structure and the manufacturing process of this embodiment are the same as those of the embodiment in FIG. 1, except that the supplementary insulating layer consisting of silicon oxide layer 20 is formed by oxidizing the surface of semiconductor layer 15. Silicon oxide layer 20 was formed as follows. First, contact layer 16 was formed by etching and eliminating the n+ amorphous silicon film between the source and the drain electrodes. Then, the surface of the semiconductor layer 15 was exposed to oxygen (O2) plasma for five minutes. Silicon oxide layer 20 that is 20 nm thick was formed by oxidizing the surface of semiconductor layer 15. This oxidation process is preferably performed in the etching device for n+ amorphous silicon film, with the vacuum being held, if possible. As a result, the enhancement type TFT characteristics, as shown in FIG. 2, in which Vth is equal to 10 volts, was also obtained in this thin film transistor. It is not required to control the threshold value after the completion of the thin film transistor. Further, it turned out for the same reason as embodiment 1 that it is desirable to set the composition ratio (x) of the silicon oxide layer 20 to a value equal to or more than 1.7 in order to obtain the enhancement type TFT characteristics in which Vth is equal to or more than 1.7. For this purpose, the high-frequency power of the oxygen plasma was set to a value equal to or more than 500W.

Because the threshold voltage Vth is held to a value equal to or more than 10 volts by the silicon oxide layer 20 in this embodiment, it is not required to use silicon oxide having a composition ratio (x) equal to or more than 1.7 as the supplementary insulating layer 19. Silicon nitride that is 500 nm thick and is formed by a plasma CVD method may be used. Further, instead of the plasma CVD method which requires vacuum equipment, an insulating layer which can be formed by a more simple and lower-cost coating method, such as a spin-coating method, for example; an organic insulating layer consisting of polyimide that is 1 μm thick, may be adopted; and a coating type silicon oxide film obtained by heat-treating poly-di-silazane at 200° C. may also be adopted. In the prior art, the threshold voltage Vth drops and fluctuates because of the electrical instability of these coating type insulating layers when formed directly on semiconductor layer 15. However, in this embodiment, a stable and constant threshold voltage Vth can be obtained, because the silicon oxide layer 20 prevents the effect of the coating type insulating layer.

Further, the dependence of the threshold voltage Vth on the thickness of each of the gate insulating layers 13, 14, semiconductor layer 15, supplementary insulating layer 19, and silicon oxide layer 20 was observed with respect to the thin film transistor described in EMBODIMENTs 1 and 2. As a result, the fluctuation of the threshold voltage Vth was within ±1 volt, and thus a constant Vth was obtained.

Embodiment 3

FIG. 6 shows the structure of a pixel part in an active matrix type liquid crystal display apparatus using the common-wiring-less IPS system according to an embodiment of the present invention. Further, FIGS. 6A and 6B also show a section of the pixel part taken along the lines (A)–(A') and (B)–(B') in FIG. 6, respectively. In FIG. 6, in which the opposite substrate is not shown, there is a glass substrate 11, a gate electrode (scanning wiring) 12 consisting of Cr, a first gate insulating layer 13 consisting of silicon nitride, a second gate insulating layer 14 consisting of silicon oxide, a semiconductor layer 15 consisting of amorphous silicon, a contact layer 16 consisting of n+ amorphous silicon in which phosphor is doped, a source electrode (pixel electrode) 17 and a drain electrode (signal wiring) 18, each of which consists of Cr, and a supplementary insulating layer 19 consisting of silicon oxide. The single silicon oxide layer may be used as a gate insulating layer, instead of silicon nitride. If the silicon oxide layer 20 is formed on the surface of semiconductor layer 15, materials not including silicon oxide may be used as the supplementary layer 19. A holding capacitance 21 is formed by the gate insulating layers 13, 14 sandwiched between crossing portions of the drain electrode 18 and gate electrode (scanning wiring) 12. The orientation direction of the liquid crystal layer is controlled by an electric field applied between the common electrodes 22 extended from the front stage gate electrode 12 and drain electrode 18 extended in parallel between common electrodes. Light passes between common electrodes 22 and drain electrode 18. Then, the light is injected into the liquid crystal layer and modulated therein. Because the front stage gate electrode 12 assumes a role of the common wiring in the common-wiring-less IPS system, the common wiring is not needed.

As described above, it is possible to realize an active matrix type liquid crystal display apparatus of the common-wiring-less IPS system by using the thin film transistor shown in EMBODIMENT 1 and EMBODIMENT 2. In the thin film transistor according to this embodiment, it is not required to control the threshold voltage by using special threshold voltage controlling equipment.

Particularly, in the case of the thin film transistor according to EMBODIMENT 2 in which a silicon oxide layer is formed on the surface of semiconductor 15, stable and constant enhancement type TFT characteristics in which Vth=10 V are obtained, even though an organic insulating layer, consisting of a coating type silicon oxide or polyimide, which can form by using a coating method, such as a spin coating method, is used as a supplementary insulating layer.

Embodiment 4

Figure 7:
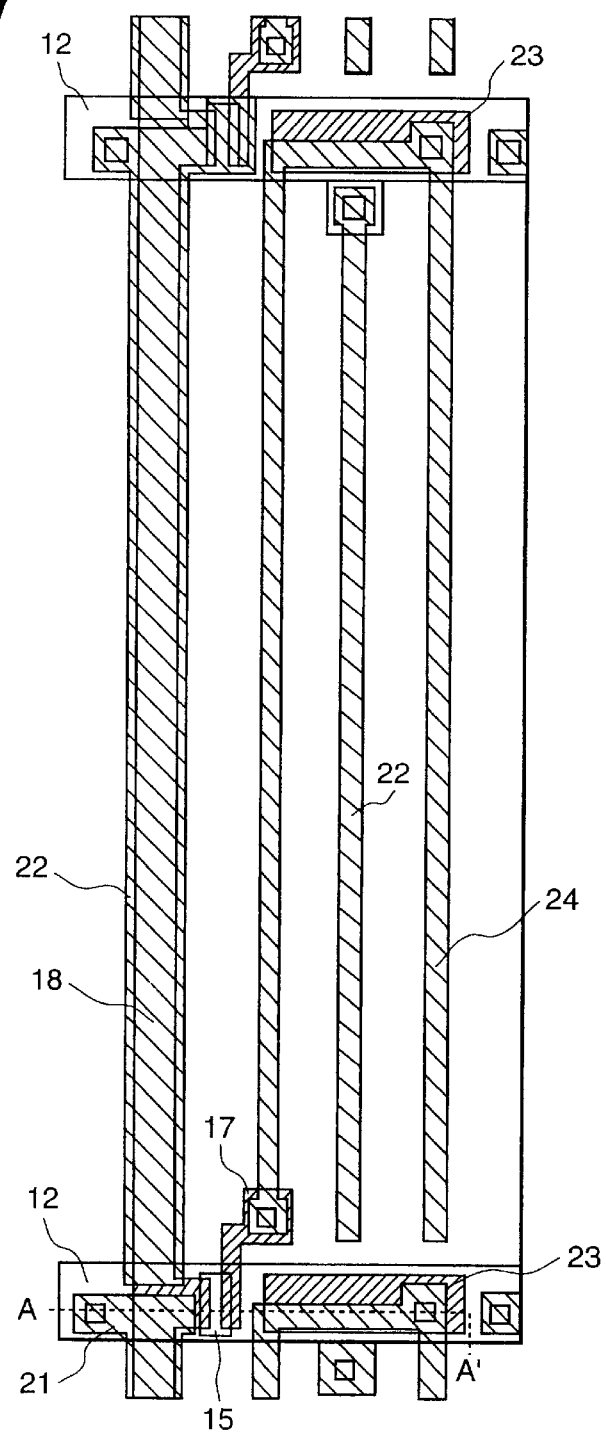
FIG. 7 is a plane sectional view showing another embodiment of a pixel part in the liquid crystal display apparatus of the present invention.
Figure 7A:
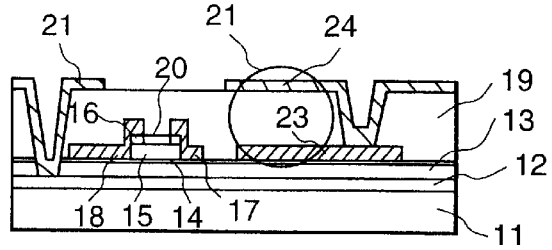
FIG. 7A is a section view taken along line A–A' in FIG. 7.

FIG. 7 shows the structure of a pixel part in an active matrix type liquid crystal display apparatus using the common-wiring-less IPS system according to another embodiment of the present invention. Further, FIG. 7A shows also a section of the pixel part taken along the line (A)–(A') in FIG. 7. In FIG. 7, in which the opposite substrate is not shown, there is a glass substrate 11, a scanning wiring (gate electrode) 12 consisting of Cr, a first gate insulating layer 13 consisting of silicon nitride, a second gate insulating layer 14 consisting of silicon oxide, a semiconductor layer 15 consisting of amorphous silicon, a contact layer 16 consisting of n+ amorphous silicon in which phosphor is doped, a source wiring 17 consisting of Cr, a drain electrode signal wiring 18 consisting of Cr, a supplementary insulating layer 19 consisting of an organic film, a silicon oxide layer 20, common electrodes 22 and 22', a holding capacitance terminal 23 consisting of Cr, and a pixel electrode 24.

In this embodiment, there is provided a silicon oxide layer 20. Further, the composition ratio of the silicon oxide which forms gate insulating layer 14 and silicon oxide layer 20 is equal to or more than 1.7.

For example, the TFT substrate is manufactured in the following way. First, a Cr film that is 300 nm thick is formed on a Corning 1737 glass substrate 11 by using a sputtering method. Next, the gate electrode 12 which becomes a scanning wiring is formed by patterning Cr using a photo-etching method. By using a plasma chemical vapor deposition (CVD) method, a silicon nitride layer that is 250 nm thick, a silicon oxide layer that is 50 nm thick, an amorphous silicon layer that is 200 nm thick, and an n⁺ amorphous silicon layer in which phosphor is doped, are formed in order. Source gases used to form each layer are as follows: SiH₄+NH₃+N₂ for n silicon nitride layer; SiH₄+N₂O for a silicon oxide; SiH₄+H₂ for an amorphous silicon layer; and SiH₄+H₃+PH₃ for an n⁺ amorphous silicon layer. Then, the semiconductor layer 15 is formed by working an n⁺ amorphous silicon layer, an amorphous silicon layer, and silicon oxide like an island at the same time by photo-etching.

On the semiconductor film 15, signal wiring 18, source electrode 17 and holding capacitance terminal 23 are formed by photo-etching and patterning of the Cr film that is 300 nm thick and is formed by using a sputtering method. Further, by etching the n⁺ amorphous silicon layer not covered with signal wiring 18 and source electrode 17, the contact layer 16 is formed between source electrode 17 and semiconductor layer 15, and between the signal wiring 18 and the semiconductor layer 15. Further, the supplementary insulating layer 19 or passivation film that is 1000 nm thick consisting of polyimide is formed by using a spin-coating method. After forming a contact hole in the supplementary insulating layer 19 and the first gate insulating layer 13 by photo-etching, a metal film that is 300 nm thick is formed by using a sputtering method. Finally, common electrodes 22 and 22' are formed by photo-etching and patterning of the metal film.

Thereby, pixel electrode 24 and source electrode 17, and holding capacitance terminal 105 are connected through the contact hole, and common electrode 22 and gate electrode 12 are connected to each other.

The holding capacitance is formed in the portion sandwiched between the gate electrode 12 of the first gate insulating layer 13 and the holding capacitance terminal 23. On this portion, an orientation film that is 200 nm thick is formed by using a spin-coating method.

In FIGS. 6 and 7, the opposite substrate not shown is constructed as follows. First, a color filter that is 500 nm thick is formed on a Corning 1737 glass substrate by using a spin-coating method. Then, a protective film that is 500 nm thick and an orientation film that is 200 nm thick are formed by using a spin-coating method.

After orientation-processing the surfaces of each of the TFT and the opposite substrates, a liquid crystal composition material is charged into the space of the cell gap formed by opposing the substrates to each other so as to sandwich beads that are approximately 4 μm in diameter consisting of silicon oxide. As a result, the liquid crystal layer is formed. Finally, a deflecting plate is attached to the surface of each of the TFT and the opposite substrates, and the liquid crystal panel is completed.

The method of forming silicon oxide layer 20 is the same as the one in EMBODIMENT 2. In order to decrease the area of the pixel portion occupied by the wiring and the electrodes and increase an aperture area, a common-wiringless system is adopted. Further, in this structure, the signal wiring 18 and common electrode 22 are superposed through supplementary insulating layer 19. In order to decrease the parasitic capacitance produced by supplementary insulating layer 19 sandwiched in the superposed portion, supplementary insulating layer 19 should be made of low dielectric constant material. More particularly, it should consist of an organic film, such as a polyimide, with a dielectric constant of 3.5, and preferably, the thickness of the film is equal to or more than 2 μm. In case the supplementary insulating layer 19 consisting of polyimide directly contacts the semiconductor layer 15, the thin film transistor may experience fluctuation of its threshold voltage Vth over ±2 volts due to the effect of the supplementary insulating layer 19 being electrically unstable. Because the silicon oxide layer 20 lies between the semiconductor layer 15 and the supplementary insulating layer 19 in this embodiment, the stability of the threshold voltage Vth is extremely improved and is not subject to the effect of supplementary insulating layer 19.

According to this embodiment, it is not required to provide extra an step in the control of the threshold voltage. Therefore, the process can be simplified, and thus it becomes possible to lower the costs.

What is claimed is:

1. A liquid crystal display apparatus having a pair of substrates, one of which is transparent, and a liquid crystal layer sandwiched between the substrates, and further having, on one of the substrates, a plurality of scanning electrodes, a plurality of signal electrodes intersecting like a matrix with said plurality of scanning electrodes, a plurality of switching devices, each being provided at a position corresponding to a respective one of the intersecting points between said plurality of scanning electrodes and said plurality of signal electrodes, a plurality of pixel electrodes connected to said switching devices, and a plurality of common electrodes connected to said plurality of scanning electrodes, and formed so that an electric field can be produced between said pixel electrodes and the common electrodes, wherein said switching device comprises a thin film transistor having a gate insulating layer consisting of a laminated film of silicon nitride and silicon oxide, a semiconductor layer of amorphous silicon, a drain electrode and a source electrode, and a supplementary insulating layer, laminated in order on the gate electrode, and wherein the supplementary insulating layer has a portion consisting of a silicon oxide layer formed by oxidizing a surface of the amorphous silicon semiconductor layer.

2. A liquid crystal display apparatus according to claim 1, wherein the composition ratio (x) of silicon oxide (SiOx) of the silicon oxide film of the gate insulating layer adjacent to the semiconductor layer and of the silicon oxide layer of the supplementary insulating layer is equal to or more than 1.7.

3. A liquid crystal display apparatus according to claim 1, wherein the threshold voltage of said thin film transistor is equal to or more than the maximum drive voltage.

* * * * *